US009477627B2

United States Patent
Conrad et al.

(10) Patent No.: US 9,477,627 B2
(45) Date of Patent: Oct. 25, 2016

(54) INTERCONNECT TO COMMUNICATE INFORMATION UNI-DIRECTIONALLY

(71) Applicant: Intel Corporation, Santa Clara, CA (US)

(72) Inventors: Shaun M. Conrad, Cornelius, OR (US); William Knolla, Folsom, CA (US); Douglas R. Moran, Folsom, CA (US); SM M. Rahman, Folsom, CA (US); Jawad Haj-Yihia, Haifa (IL); Alon Naveh, Ramat Hasharon (IL); Ohad Falik, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 13/727,052

(22) Filed: Dec. 26, 2012

(65) Prior Publication Data

US 2014/0181352 A1 Jun. 26, 2014

(51) Int. Cl.
*G06F 13/40* (2006.01)
*G06F 1/32* (2006.01)

(52) U.S. Cl.
CPC .......... *G06F 13/4068* (2013.01); *G06F 1/324* (2013.01); *G06F 1/3206* (2013.01); *G06F 1/3237* (2013.01); *G06F 1/3296* (2013.01); *Y02B 60/1217* (2013.01); *Y02B 60/1221* (2013.01); *Y02B 60/1235* (2013.01); *Y02B 60/1285* (2013.01)

(58) Field of Classification Search
CPC ............ G06F 13/4068; G06F 1/3206; G06F 1/3237; G06F 1/324; G06F 1/3296
See application file for complete search history.

(56) References Cited

U.S. PATENT DOCUMENTS

| 2003/0025689 | A1* | 2/2003 | Kim ............................... 345/211 |
| 2006/0282688 | A1* | 12/2006 | Bahali et al. ................. 713/300 |
| 2008/0104425 | A1* | 5/2008 | Gunther ............... G06F 1/3203 713/300 |
| 2010/0049885 | A1 | 2/2010 | Chandra et al. |
| 2010/0280676 | A1 | 11/2010 | Pabon et al. |
| 2011/0084979 | A1* | 4/2011 | Rutman et al. ............... 345/589 |
| 2011/0208980 | A1 | 8/2011 | Brooks et al. |
| 2011/0264938 | A1 | 10/2011 | Henroid et al. |
| 2012/0078690 | A1 | 3/2012 | Harriman et al. |
| 2012/0110351 | A1* | 5/2012 | Raju et al. ..................... 713/300 |
| 2014/0068291 | A1* | 3/2014 | Man ......................... G06F 1/32 713/320 |
| 2014/0149751 | A1* | 5/2014 | Baysah et al. ................ 713/300 |

OTHER PUBLICATIONS

International Searching Authority, "Notification of Transmittal of the International Search Report and the Written Opinion of the International Searching Authority," mailed Nov. 6, 2013, in International application No. PCT/US2013/048358.

\* cited by examiner

*Primary Examiner* — Nimesh G Patel
(74) *Attorney, Agent, or Firm* — Trop, Pruner & Hu, P.C.

(57) ABSTRACT

A processor includes at least one core, a power control unit, and a first interconnect to couple with a peripheral controller. The first interconnect is to provide a first uni-directional communication path for communication of first power management data from the processor to the peripheral controller. Other embodiments are described and claimed.

19 Claims, 9 Drawing Sheets

INTERCONNECT TO COMMUNICATE INFORMATION UNI-DIRECTIONALLY

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

In various embodiments, a processor may include a core such as a central processing unit (CPU), and a first interconnect such as a power management_down (PMDOWN) interconnect ("pin") to couple with a peripheral controller such as a peripheral control hub (PCH). The PMDOWN interconnect may provide a first uni-directional communication path for communication of data, e.g., power management (PM) data, from the CPU to the PCH. Additionally, in response to the first PM information communicated from the CPU to the PCH, second PM information can be communicated from the PCH to the CPU via a second ("PM_synchronization" or "PMSYNC") interconnect. In an embodiment, the PMDOWN interconnect allows the CPU to be placed in a lower activity state (e.g., one of states $C_1$ to $C_n$ that consumes less power than when the processor is in an active state, according to the Advanced Configuration and Power Interface (ACPI) standard, e.g., Rev. 5.0, published November, 2011) and still communicate, because the PMDOWN link does not consume any power, and hence power-consuming links, e.g., a bus, are not needed to communicate PM information from the CPU to the PCH.

Figure 1:
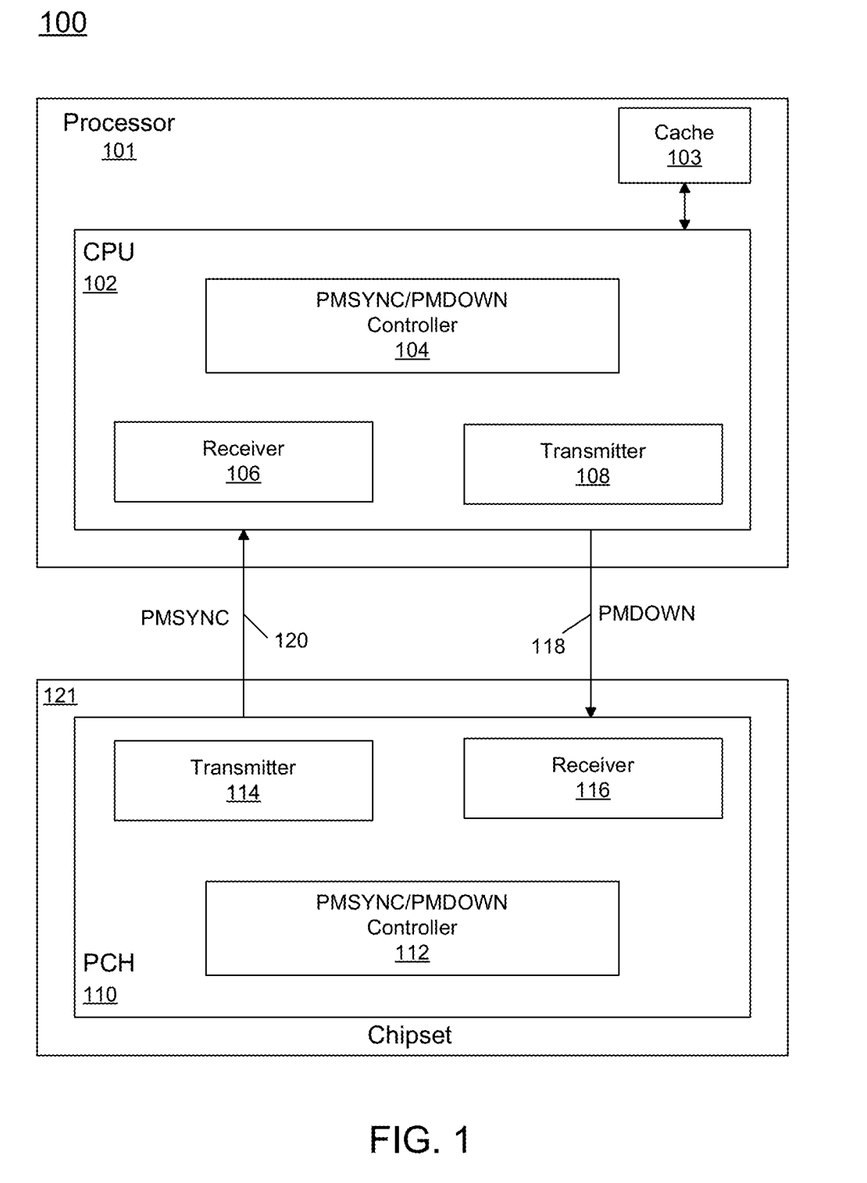
FIG. 1 is a block diagram of a processor in accordance with an embodiment of the present invention.

Referring now to FIG. 1, shown is a block diagram of a portion of a system 100 in accordance with an embodiment of the present invention. The system 100 includes a processor 101 and a chipset 121. The processor 101 includes one or more cores (e.g., central processing units), including CPU 102, and a data cache 103. The CPU 102 includes a PMSYNC/PMDOWN controller 104, a receiver 106, and a transmitter 108. The chipset 121 includes a peripheral control hub (PCH) 110 that includes a PMSYNC/PMDOWN controller 112, a transmitter 114 and a receiver 116. The CPU 102 is coupled to the PCH 110 via two single wire interconnects (e.g., pins): a PMDOWN 118 interconnect and a PMSYNC 120 interconnect. In an embodiment, the PMDOWN 118 may be a first conductor, e.g., a first interconnect, to electrically connect the transmitter 108 to the receiver 116. The PMSYNC 120 may be a second conductor, e.g., a second interconnect, to electrically couple the transmitter 114 in the PCH 110 to the receiver 106 in the CPU 102.

In operation, the PMSYNC/PMDOWN controller 112 may generate first power management data, e.g., a request to switch off (or switch on) a clock at the PCH 110. CPU 102 may receive the first power management data from the PCH 110 via the PMSYNC 120, which may be configured for uni-directional transmission from the PCH 110 to the CPU 102. The PMSYNC/PMDOWN controller 104, after receiving the first power management data from the PCH 110, may respond with a second power management data, e.g., acknowledgment that the clock has been switched off (or switched on), from the CPU 102 to the PCH 110 via the PMDOWN 118, which may be configured for uni-directional transmission from the CPU 102 to the PCH 110.

By sending the second power management data via a dedicated interconnect, e.g., PMDOWN 118, the CPU 102 can operate at a reduced frequency since no power is needed to support the conduction path from the CPU 102 to the PCH 110. That is, because no bus is needed to convey power management data from the CPU 102 to the PCH 110, the CPU 102 can be placed into a reduced activity state, e.g., C1, prior to transmission of the second power management data, with consequent power savings, while being able to respond to requests from the PCH 110, which may provide the second power management data to, e.g., other components of the chipset 121.

In another example, power management data may be initiated and sent from CPU 102 via PMDOWN 118 to PCH 110, e.g. request to turn off shared power planes initiated at CPU 102, sent via PMDOWN 118 to PCH 110. A response, e.g., acknowledgment to indicate preparation is in progress to turn off shared power planes, may be received by the CPU 102 from the PCH 110 via PMSYNC 120. In other examples, the PMDOWN 118 may carry a clock request, a request for a handshake on voltage information, a throttling request to the PCH related to consumed power, a notification to the PCH deeper power actions can be taken by the PCH, notification to the PCH that a reduction in power consumption can be executed, or other requests or instructions. For example, when a voltage rail for a primary communication path, e.g., bus, is shared between the CPU 102, the PCH 110 may initiate a negotiation message, e.g., a request to shut down the voltage rail, to the PCH 110 via the PMDOWN 118. The PCH 110 may acknowledge or deny the negotiation message via the PMSYNC 120. The negotiation message would not otherwise be sent via the primary communication path due to, e.g., timing issues in two-way communications via this path.

In another example, when the CPU 102 is to go into a deep package C-state, such as C6 (e.g., some clocks and/or voltages turned off), the CPU 102 may make a request to the PCH 110 via the PMDOWN 118 to turn off an incoming clock from the PCH 110. If certain conditions associated with the request are met, (e.g., duration of the power state, level of a power state and so forth), one or more clock generators at the PCH such as a phase locked loop (PLL), crystal oscillator, or other generator may be powered off.

In yet another example, the CPU 102 may go into a deep package C-state and the CPU 102 knows that its latency will be much greater than is anticipated by the PCH 110. The CPU 102 can notify the PCH 110 of the actual latency via the PMDOWN 118, and the PCH 110 can take additional power actions, e.g., asserting sleep on the PCH voltage regulator. Such a notification may be sent via the PMDOWN 118, as the notification can be sent after other power actions have been taken.

Figure 2:
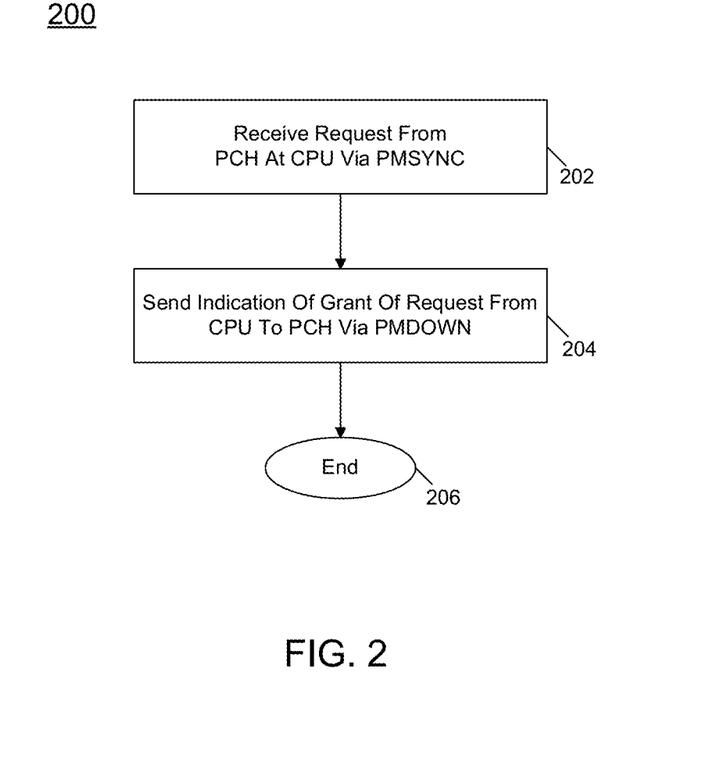
FIG. 2 is a flow diagram of a method in accordance with an embodiment of the present invention.

Referring now to FIG. 2, shown is a flow diagram of a method 200 in accordance with an embodiment of the present invention. At block 202, a CPU receives a power management request from a PCH via a PM_synchronization ("PMSYNC") interconnect that provides uni-directional communication from the PCH to the CPU. This request may be directed to power control logic of the processor such as a power control unit (PCU) or other power control circuitry to take appropriate action responsive to the request or other power management information received from the PCH. In many situations, the PCU may grant the request and provide a grant signal back to the PCH. To this end, moving to block 204, in response to the request, the CPU sends an indication of grant of the power management request to the PCH via a PMDOWN interconnect that provides uni-directional communication from the CPU to the PCH. The method ends at 206. In an embodiment, data is transmitted in packets of a fixed length, each packet preceded by a start bit and followed by an end bit, and the packet transmission starts with a least significant bit and ends with a most significant bit. For example, a data packet transmitted via PMDOWN interconnect from the CPU to the PCH may have a start bit, e.g., a 1, followed by eight bits of data (beginning with a least significant bit and ending with a most significant bit) which is followed by an end bit, e.g., a 0. In another example, another data packet that is to be transmitted via a PMSYNC interconnect from the PCH to the CPU may have a start bit, e.g., a 1, followed by sixteen bits of data (beginning with a least significant bit and ending with a most significant bit) which is followed by an end bit, e.g., a 0.

As an example of the method of FIG. 2, a CPU may receive a request to turn off a clock from a PCH via a PMSYNC interconnect. In response, the CPU may send an indication of a grant of the request to turn off the clock and may notify the PCH via the PMDOWN interconnect. As another example, the CPU may receive a request, via the PMSYNC interconnect, from the PCH to turn on a clock of the PCH. In response, the CPU may grant the request to turn on the clock and may notify the PCH that the request has been granted via the PMDOWN interconnect.

Figure 3:
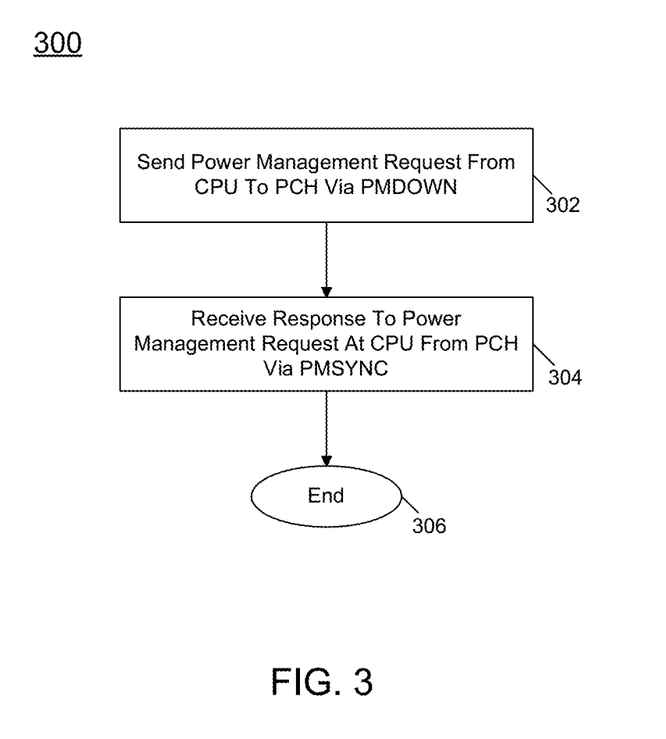
FIG. 3 is a flow diagram of a method in accordance with another embodiment of the present invention.

Referring now to FIG. 3, shown is a flow diagram of a method 300 in accordance with an embodiment of the present invention. At block 302, a power management request is sent from the CPU, via a PMDOWN interconnect that provides uni-directional communication from the CPU to a PCH. Moving to block 304, in response to the power management request, the CPU receives a response from the PCH via a PMSYNC interconnect. The method ends at 306. In an embodiment, data may be transmitted via the PMDOWN in first packets of a first fixed length, e.g., eight bits per packet, and response data may be transmitted via the PMSYNC in second packets of a second fixed length, e.g., 16 bits per packet. Each of the first and second packets may be preceded by a start bit and followed by an end bit, and the packet transmission may start with a least significant bit and end with a most significant bit.

As an example of the method of FIG. 3, the CPU sends a request via the PMDOWN interconnect to enable a clock at the PCH. In response, the PCH sends a confirmation of enablement of the clock via the PMSYNC interconnect. As another example, the CPU sends throttle information (e.g., to slow traffic to the CPU), via the PMDOWN interconnect, to the PCH. In response, the PCH sends a confirmation, via the PMSYNC interconnect, to indicate that traffic is to be throttled. As yet another example, the CPU sends to the PCH a request to turn off shared power planes, the request sent via the PMDOWN interconnect. In response, the PCH sends a confirmation to the CPU via the PMSYNC interconnect that shared power planes are to be turned off. Use of the PMDOWN interconnect for uni-directional communication to the PCH and a separate PMSYNC interconnect for uni-directional communication to the CPU can avert a potential for both the CPU and the PCH to assert messages on the same interconnect concurrently, in some embodiments. However, it is possible to provide for different interconnect structures and enable bidirectional communication of power management information.

Figure 4:
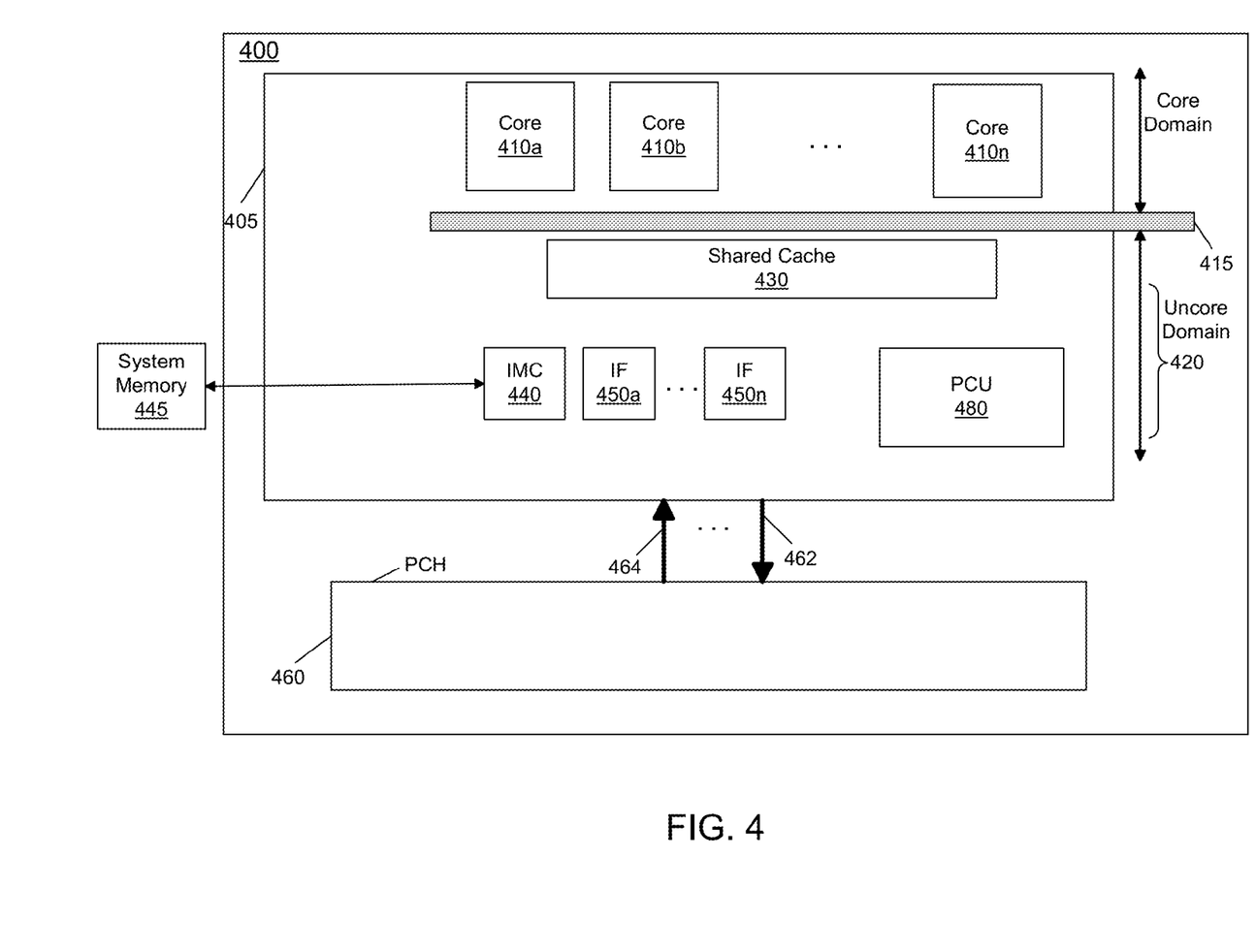
FIG. 4 is a block diagram of a processor in accordance with another embodiment of the present invention.

Referring now to FIG. 4, shown is a block diagram of a processor in accordance with an embodiment of the present invention. As shown in FIG. 4, processor 400 may be a multicore processor including first die 405 having a plurality of cores 410$_a$-410$_n$ of a core domain. The various cores may be coupled via an interconnect 415 to a system agent or uncore domain 420 that includes various components. As seen, the uncore domain 420 may include a shared cache 430 which may be a last level cache. In addition, the uncore may include an integrated memory controller 440, various interfaces 450, and a power control unit 480. In an an embodiment, PCU 480 may include, in addition to power management logic, communication logic to communicate power management information with a PCH die 460 via one or more uni-directional sideband channels separate from a primary communication channel interconnecting the die.

As further shown in FIG. 4, a second die, PCH die 460, may also be present within processor 400. In accordance with embodiments of the present invention, also shown is a PMDOWN interconnect 462 to provide uni-directional communication from the first die 405 to the PCH die 460, and a PMSYNC interconnect 464. The first die 405 may communicate with the PCH die 460 via the PMDOWN interconnect 462 that is to provide uni-directional communication of, e.g., power management data, from the first die 405 to the PCH 460. Also shown is a PMSYNC interconnect 464 to provide uni-directional communication of, e.g., power management data, from the PCH 460 to the first die 405. In an embodiment, use of the PMDOWN interconnect 462 and the PMSYNC interconnect 464 may be dedicated to transfer of power management data between the first die 405 and the PCH die 460, and other interconnects (not shown), e.g., bus, may be used to transmit other types of data between the dies 405 and 460.

With further reference to FIG. 4, processor 400 may communicate with a system memory 445, e.g., via a memory bus 446. In addition, by interfaces 450, connection can be made to various off-package components such as peripheral devices, mass storage and so forth. While shown with this particular implementation in the embodiment of FIG. 4, the scope of the present invention is not limited in this regard. For example, in one embodiment, PCH 460 may be located in a separate semiconductor package coupled to processor 400 at least via multiple power management uni-directional interconnects.

Figure 5:
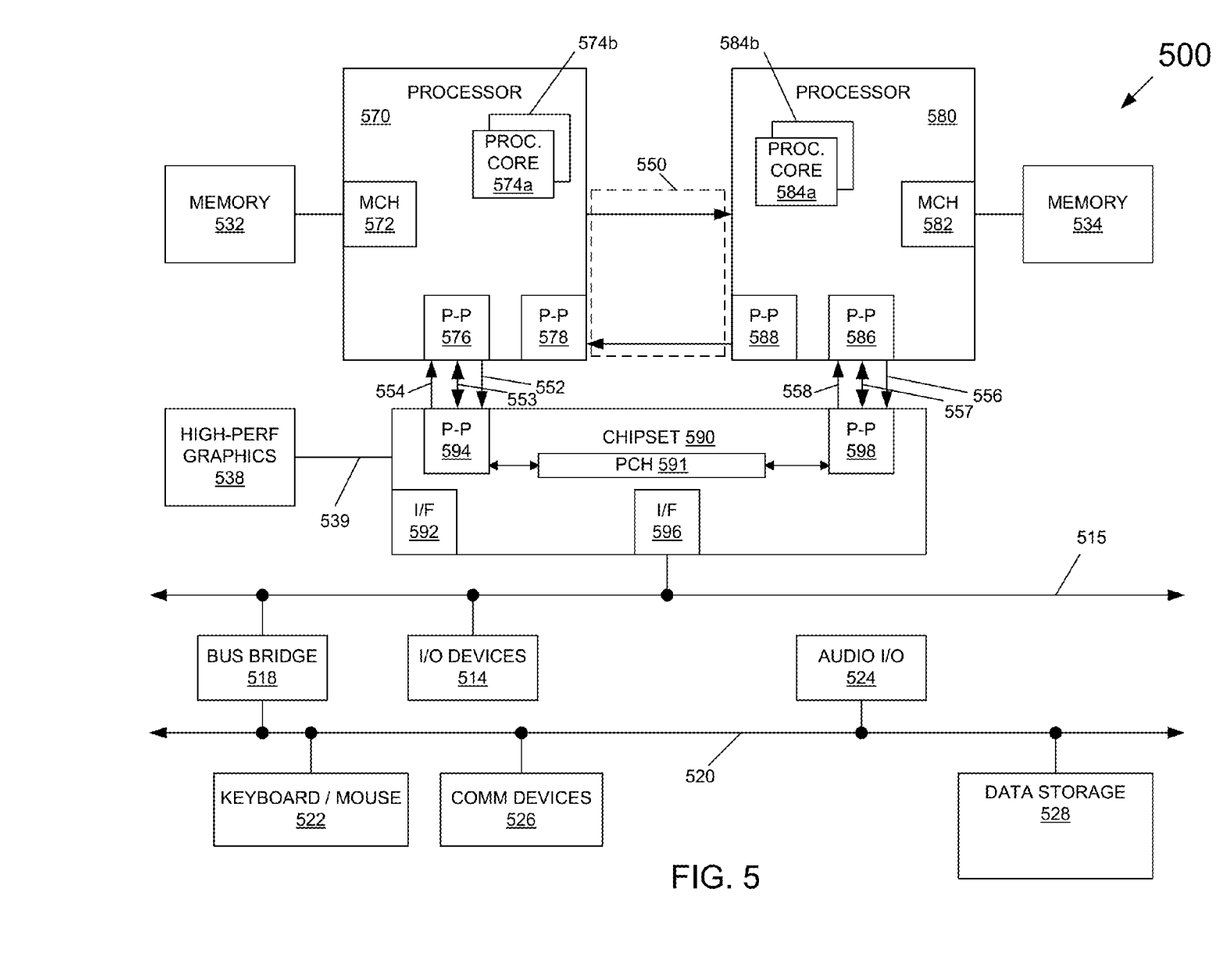
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574*a* and 574*b* and processor cores 584*a* and 584*b*), although potentially more cores may be present in the processors.

Still referring to FIG. 5, the first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 5, chipset 590 includes P-P interfaces 594 and 598. As shown in the embodiment of FIG. 5, the first processor 570 is coupled to the chipset 590 via two uni-directional interconnects: a PMDOWN interconnect 552 that provides a uni-directional data path from the processor 570 to a PCH 591 within the chipset 590, and a PMSYNC interconnect 554 that provides a uni-directional data path from the PCH 591 to the processor 570, as described herein. Additionally, a two-way interconnect 553 can provide a two-way path between the processor 570 and the chipset 590, e.g., when the processor 570 is in an active state such as a C0 state. The second processor 580 is coupled to the chipset 590 via two interconnects: a PMDOWN interconnect 556 that provides a uni-directional data path from the processor 580 to the PCH 591, and a PMSYNC interconnect 558 that provides a uni-directional data path from the chipset 590 to the processor 580, as described herein. Additionally, a two-way interconnect 557 can provide a two-way path between the processor 580 and the chipset 590, e.g., when the processor 580 is in an active state such as the C0 state.

Furthermore, chipset 590 includes an interface 592 to couple chipset 590 with a high performance graphics engine 538 by a P-P interconnect 539. In turn, chipset 590 may be coupled to a first bus 515 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device. Further, an audio I/O 524 may be coupled to second bus 520. Embodiments can be incorporated into other types of systems including mobile devices such as a smart cellular telephone, tablet computer, netbook, Ultrabook™, and so forth.

Figure 6:
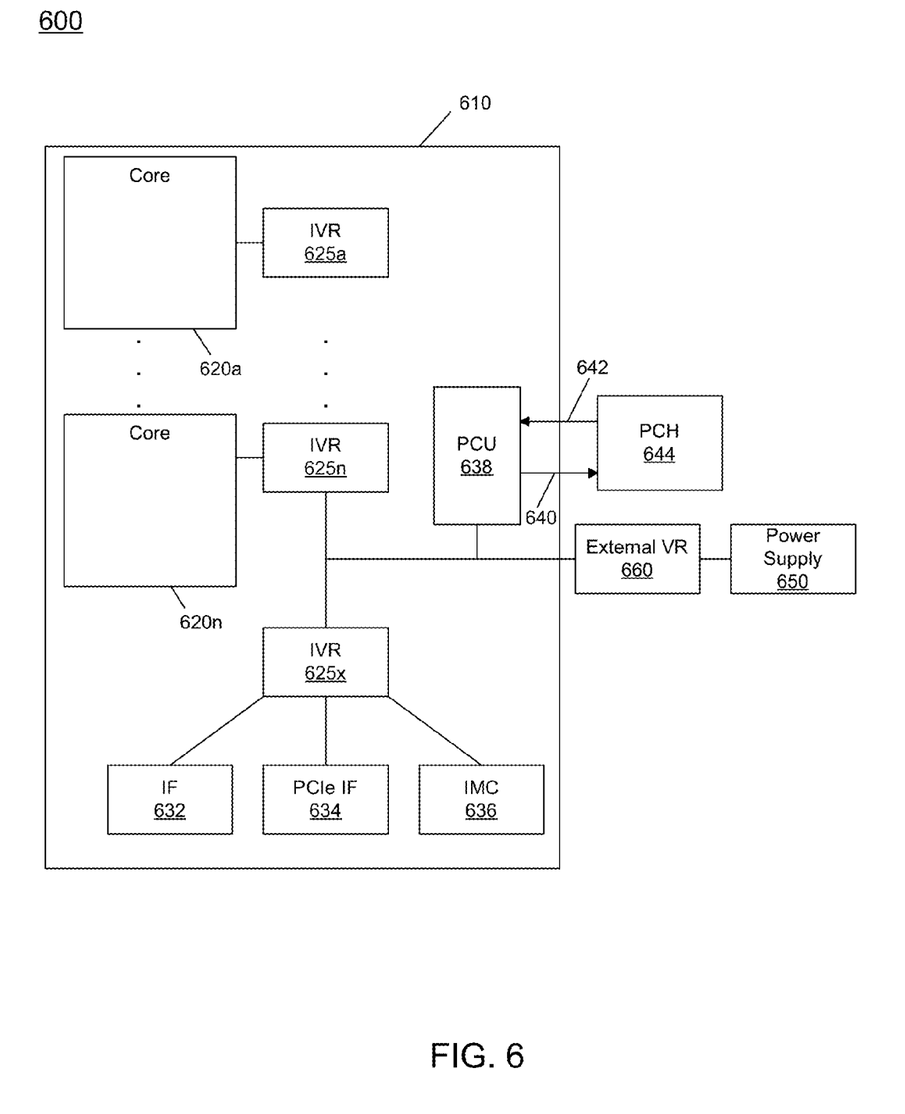
FIG. 6 is a block diagram of a system in accordance with another embodiment of the present invention.

Referring now to FIG. 6, shown is a block diagram of a portion of a system in accordance with an embodiment of the present invention. As shown in FIG. 6, system 600 may include various components, including a processor 610 which as shown is a multicore processor. Processor 610 may be coupled to a power supply 650 via an external voltage regulator 660, which may perform a first voltage conversion to provide a primary regulated voltage to processor 610.

As seen, processor 610 may be a single die processor socket including multiple cores 620*a*-620*n*. In addition, each core may be associated with an individual voltage regulator 625*a*-625*n* to allow for fine-grained control of voltage and thus power and performance of each individual core. As such, each core can operate at an independent voltage and frequency, enabling great flexibility and affording wide opportunities for balancing power consumption with performance.

Still referring to FIG. 6, additional components may be present within the processor including an input/output interface 632, another interface 634, and an integrated memory controller 636. As seen, each of these components may be powered by another integrated voltage regulator 625*x*. In one embodiment, interface 632 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 634 may be in accordance with a Peripheral Component Interconnect Express (PCIe™) specification, e.g., the PCI Express™ Specification Base Specification version 2.0 (published Jan. 15, 2007).

Also shown is a power control unit (PCU) 638, which may include hardware, software and/or firmware to perform power management operations with regard to processor 610. PCU 638 may be coupled via a dedicated interface to external voltage regulator 660. In this way, PCU 638 can instruct the voltage regulator to provide a requested regulated voltage to the processor.

The PCU 638 may be coupled to a peripheral control hub (PCH) 644 via a PMDOWN 640 interconnect that is to provide uni-directional communication from the PCU 638 to the PCH 644, e.g., for communication of power management data. Additionally, the PCH 644 may be coupled to the PCU 638 via a PMSYNC 642 interconnect that is to provide a uni-directional communication path from the PCH 644 to the PCU 638 for, e.g., communication of power management information such as power management responses.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the PMDOWN uni-directional interconnect described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor. In addition, according to ACPI, a processor can operate at various power states or levels. With regard to power states, ACPI specifies different power consumption states, generally referred to as C-states C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

While not shown for ease of illustration, understand that additional components may be present within processor 610 such as additional uncore logic and other components such as internal memories, e.g., one or more levels of a cache memory hierarchy and so forth. Furthermore, while shown in the implementation of FIG. 6 with an integrated voltage regulator, embodiments are not so limited.

Figure 7:
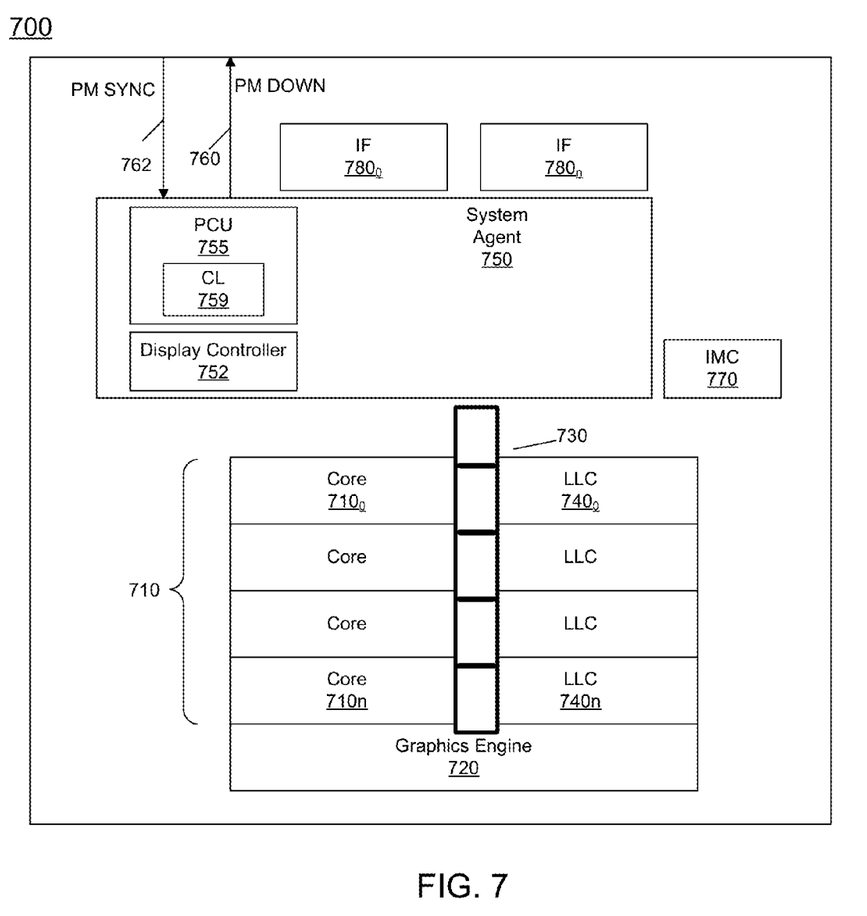
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 700 includes multiple domains. Specifically, a core domain 710 can include a plurality of cores $710_0$-$710_n$, a graphics domain 720 can include one or more graphics engines, and a system agent domain 750 may further be present. In some embodiments, system agent domain 750 may execute at an independent frequency than the core domain and may remain powered on at all times to handle power control events and power management such that domains 710 and 720 can be controlled to dynamically enter into and exit high power and low power states. Each of domains 710 and 720 may operate at different voltage and/or power. Note that while only shown with three domains, understand the scope of the present invention is not limited in this regard and additional domains can be present in other embodiments. For example, multiple core domains may be present each including at least one core.

In general, each core 710 may further include low level caches in addition to various execution units and additional processing elements. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755 which can include control logic 759 that can communicate with, e.g., a PCH (not shown), via a PMDOWN uni-directional interconnect 760 in accordance with an embodiment of the present invention as described herein, and a PMSYNC interconnect 762 (shown herein as uni-directional, but may be bidirectional in an embodiment).

As further seen in FIG. 7, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
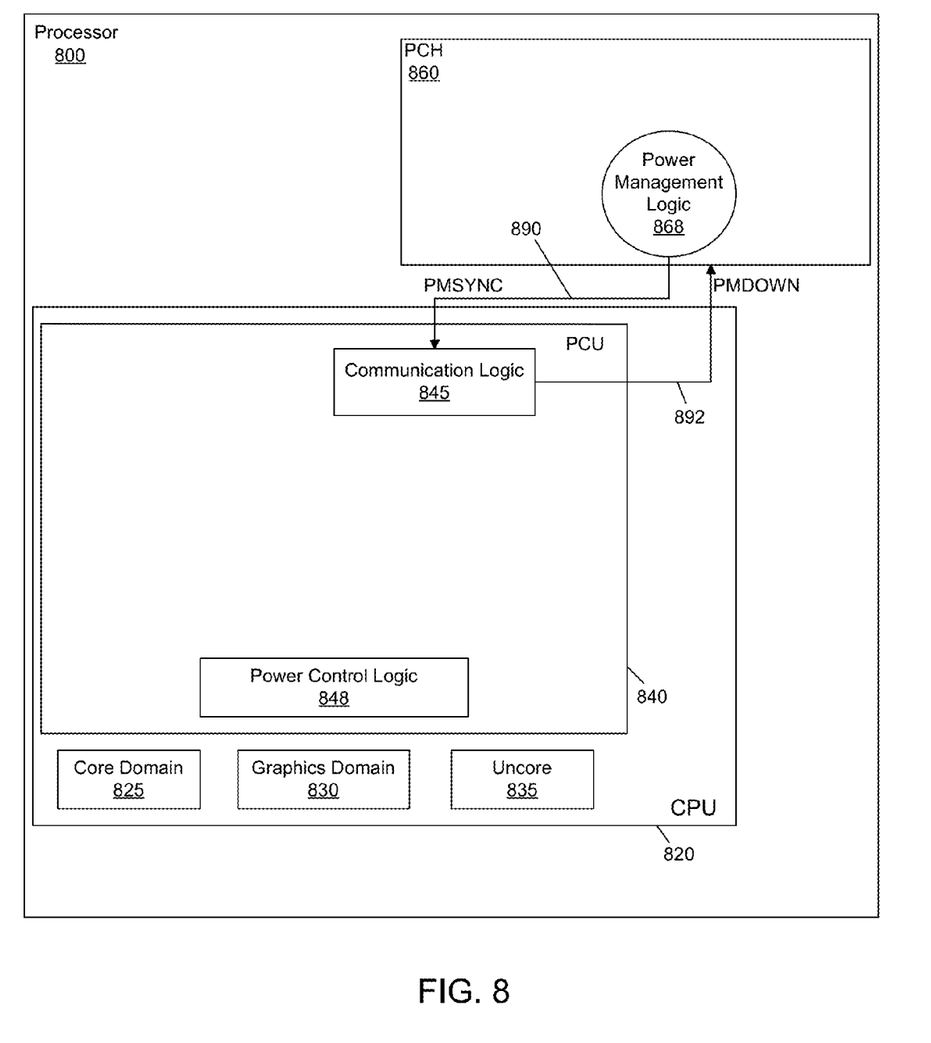
FIG. 8 is a block diagram of a processor in accordance with another embodiment of the present invention.

Referring now to FIG. 8, shown is a block diagram of a processor in accordance with another embodiment of the present invention. In FIG. 8, processor 800 may be a multicore processor that in the embodiment shown is a MCP having a first die 820 and a second die 860. As seen, first die 820 may be a CPU die that includes a plurality of independent domains. As also seen, second die 860 may be a PCH. In general, the PCH may include interface and control circuitry to provide an interface between the processor and a variety of peripheral devices such as input/output (IO) devices, e.g., user input devices (e.g., keyboard, touchpad, mouse or other pointing device, or so forth) and storage devices such as a mass storage, portable or other such storage, among many other peripheral devices.

CPU die 820 may include multiple domains including a core domain 825 which may include one or more processor cores, a graphics domain 830 which may include one or more graphics processing units (GPU) such as one or more graphics cores, and an uncore domain 835 which may include other circuitry of the processor such as cache memories, a memory controller, other fixed function units, logic circuitry and so forth. As further seen, CPU die 820 further includes a power control unit (PCU) 840 which in the embodiment shown may be configured with various circuitry, logic and so forth to perform power management operations for the processor. Note that the view shown in FIG. 8 is at a high level to show the features relevant to power management communications in accordance with an embodiment of the present invention and is not intended to show the full processor circuitry. In addition, the location of some circuitry is shown logically rather than physically, in that in some embodiments PCU 840 may be physically part of uncore domain 835. PCU 840 may include communication logic 845 to receive power management information from PCH 860 and may communicate power management information, e.g., from power control logic 848 to PCH 860.

A power management message can be sent from the PCH 860 to CPU die 820, and more specifically to PCU 840 via a sideband message link 890, which in an embodiment can be a power management synchronization (PMSYNC) link. A return power management message may be sent from the PCU 820 to the PCH 860, e.g., from communication logic 845 of the PCU 840 to power management logic 868 of the PCH 860 via a uni-directional power management (PMDOWN) link 892, according to an embodiment of the present invention. Another power management message may be sent from the PCU 840 to the PCH 860 via PMDOWN link 892 (e.g., from communication logic 845 to power management logic 868) according to embodiments of the present invention, and a return power management message may be sent via PMSYNC link 890 from the PCH 860 to the PCU 820, e.g., from power management logic 868 of the PCH 860 to communication logic 845 of the PCU 840.

While shown at this high level in the embodiment of FIG. 8, understand the scope of the present invention is not limited in this regard. For example, a primary communications path between the CPU and the PCH is not shown for ease of illustration. Also, while FIG. 8 shows an implementation in which a multicore processor is configured as a MCP including two die, in another embodiment the multicore processor may be a single die processor including both the circuitry present on the CPU die as well as the circuitry present on the PCH die. In addition, it is to be understood that additional circuitry may be present. Or in other embodiments, a different type of non-CPU circuitry may be present in a multicore processor. For example, in another embodiment instead of a PCH die, an integrated memory die or another type of die may be provided within a multicore processor. Or, in another embodiment, the multicore processor may be a single die package without included peripheral controller circuitry.

Figure 9:
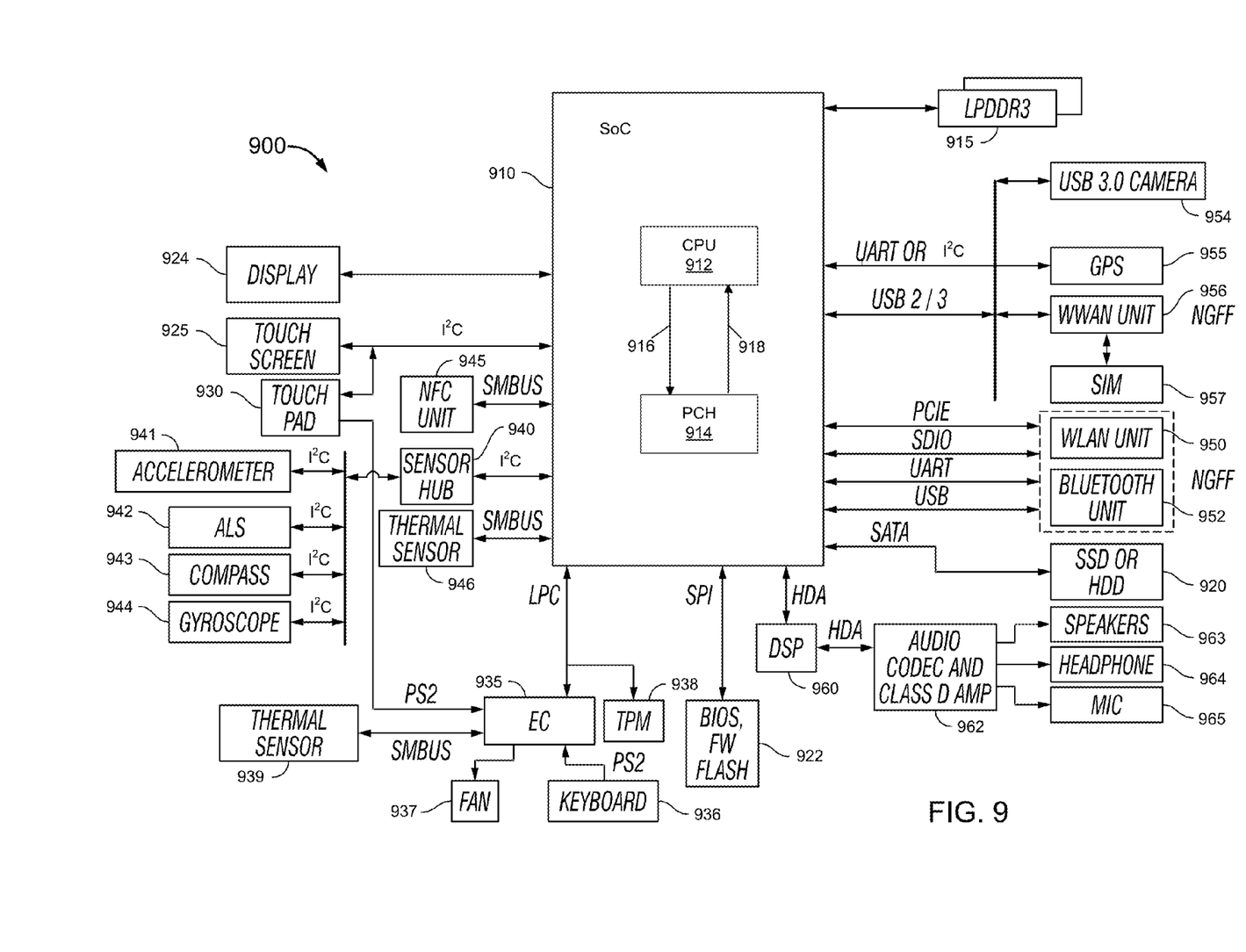
FIG. 9 is a block diagram of components present in a computer system in accordance with an embodiment of the present invention.

Referring now to FIG. 9, shown is a block diagram of components present in a computer system in accordance with an embodiment of the present invention. As shown in FIG. 9, system 900 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 9 is intended to show a high level view of many components of the computer system. However, it is to be understood that additional components may be present in certain implementations and furthermore, different arrangement of the components shown may occur in other implementations.

As seen in FIG. 9, a processor 910, which may be a low power multicore processor socket such as an ultra low voltage processor, may act as a main processing unit and central hub for communication with the various components of the system. Such processor can be implemented as a system on a chip (SoC) as described herein. In one embodiment, processor 910 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 910 may include central processing unit (CPU) 912 and peripheral control hub (PCH) 914. CPU 912 may communicate with PCH 914 via a PMDOWN uni-directional interconnect 916, in accordance with embodiments of the present invention. PCH 914 may communicate with CPU 912 via a PMSYNC uni-directional interconnect 918, in accordance with embodiments of the present invention.

Processor 910 may communicate with a system memory 915, which in an embodiment can be implemented via multiple memory devices to provide for a given amount of system memory. To provide for persistent storage of information such as data, applications, one or more operating systems and so forth, a mass storage 920 may also couple to processor 910. Also shown in FIG. 9, a flash device 922 may be coupled to processor 910, e.g., via a serial peripheral interface (SPI). This flash device may provide for non-volatile storage of system software, including a basic input/output software (BIOS) as well as other firmware of the system.

Various input/output (IO) devices may be present within system 900. Specifically shown in the embodiment of FIG. 9 is a display 924 which may be a high definition LCD or LED panel configured within a lid portion of the chassis. This display panel may also provide for a touch screen 925, e.g., adapted externally over the display panel such that via a user's interaction with this touch screen, user inputs can be provided to the system to enable desired operations, e.g., with regard to the display of information, accessing of information and so forth. In one embodiment, display 924 may be coupled to processor 910 via a display interconnect that can be implemented as a high performance graphics interconnect. Touch screen 925 may be coupled to processor 910 via another interconnect, which in an embodiment can be an I²C interconnect. As further shown in FIG. 9, in addition to touch screen 925, user input by way of touch can also occur via a touch pad 930 which may be configured within the chassis and may also be coupled to the same I²C interconnect as touch screen 925.

For perceptual computing and other purposes, various sensors may be present within the system and can be coupled to processor 910 in different manners. Certain inertial and environmental sensors may couple to processor 910 through a sensor hub 940, e.g., via an I²C interconnect. In the embodiment shown in FIG. 9, these sensors may include an accelerometer 941, an ambient light sensor (ALS) 942, a compass 943 and a gyroscope 944. Other environmental sensors may include one or more thermal sensors 946 which may couple to processor 910 via a system management bus (SMBus) bus, in one embodiment.

Also seen in FIG. 9, various peripheral devices may couple to processor 910 via a low pin count (LPC) interconnect. In the embodiment shown, various components can be coupled through an embedded controller 935. Such components can include a keyboard 936 (e.g., coupled via a PS2 interface), a fan 937, and a thermal sensor 939. In some embodiments, touch pad 930 may also couple to EC 935 via a PS2 interface. In addition, a security processor such as a trusted platform module (TPM) 938 in accordance with the Trusted Computing Group (TCG) TPM Specification Version 1.2, dated Oct. 2, 2003, may also couple to processor 910 via this LPC interconnect.

System 900 can communicate with external devices in a variety of manners, including wirelessly. In the embodiment shown in FIG. 9, various wireless modules, each of which can correspond to a radio configured for a particular wireless communication protocol, are present. One manner for wireless communication in a short range such as a near field may be via a near field communication (NFC) unit 945 which may communicate, in one embodiment with processor 910 via an SMBus. Note that via this NFC unit 945, devices in close proximity to each other can communicate. For example, a user can enable system 900 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 9, additional wireless units can include other short range wireless engines including a WLAN unit 950 and a Bluetooth unit 952. Using WLAN unit 950, Wi-Fi™ communications in accordance with a given Institute of Electrical and Electronics Engineers (IEEE) 802.11 standard can be realized, while via Bluetooth unit 952, short range communications via a Bluetooth protocol can occur. These units may communicate with processor 910 via, e.g., a USB link or a universal asynchronous receiver transmitter (UART) link. Or these units may couple to processor 910 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 956 which in turn may couple to a subscriber identity module (SIM) 957. In addition, to enable receipt and use of location information, a GPS module 955 may also be present. Note that in the embodiment shown in FIG. 9, WWAN unit 956 and an integrated capture device such as a camera module 954 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 960, which may couple to processor 910 via a high definition audio (HDA) link. Similarly, DSP 960 may communicate with an integrated coder/decoder (CODEC) and amplifier 962 that in turn may couple to output speakers 963 which may be implemented within the chassis. Similarly, amplifier and CODEC 962 can be coupled to receive audio inputs from a microphone 965 which in an embodiment can be implemented via dual array microphones to provide for high quality audio inputs to enable voice-activated control of various operations within the system. Note also that audio outputs can be provided from amplifier/CODEC 962 to a headphone jack 964. Although shown with these particular components in the embodiment of FIG. 9, understand the scope of the present invention is not limited in this regard.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core;
   a power control unit;
   a communications controller to control power management communications between the processor and a peripheral controller;
   a first interconnect to couple with the peripheral controller, wherein the first
   interconnect is to provide a first uni-directional communication path for communication of first power management (PM) data from the processor to the peripheral controller; and
   a second interconnect to provide a second uni-directional communication path for communication of second PM data from the peripheral controller to the processor, the first and second interconnects dedicated to communication of PM data, wherein the processor is to receive the second PM data from the peripheral controller via the second interconnect and in response to receipt of the second PM data, send the first PM data to the peripheral controller via the first interconnect, wherein the second PM data comprises a request to control a clock of the peripheral controller and the first PM data comprises a grant to notify the peripheral controller regarding grant of the request.

2. The processor of claim 1, wherein the processor is to be in one of a first activity state having a first frequency of operation and a second activity state having a second frequency of operation that is less than the first frequency of operation, and wherein the processor is to be in the second activity state when the first PM data is communicated from the processor to the peripheral controller via the first interconnect.

3. The processor of claim 1, wherein the first PM data further comprises a request to shut down a voltage rail for a primary communication path between the processor and the peripheral controller.

4. The processor of claim 1, wherein the first PM data further includes a notification to the peripheral controller that a reduction in power consumption can be executed by the peripheral controller.

5. The processor of claim 1, wherein the peripheral controller is to provide third PM data received from the processor to a chip set, and the peripheral controller is to receive fourth PM data from the chip set in response to the third PM data and to communicate the fourth PM data to the processor via the second interconnect.

6. The processor of claim 5, wherein the processor and peripheral controller are located within a single package.

7. The processor of claim 1, wherein the processor is to notify the peripheral controller of a latency of the processor via additional PM data, to enable the peripheral controller to take a power management action.

8. The processor of claim 1, wherein at least the first interconnect comprises a single wire interconnect.

9. A system comprising:
a processor including at least one core and a communications controller to control power management communications between the processor and a peripheral controller;
a first interconnect to couple the processor to the peripheral controller, the first interconnect to provide a first uni-directional data path from the processor to the peripheral controller to communicate first power management (PM) data;
a second interconnect to couple the peripheral controller to the processor, the second interconnect to provide a second uni-directional data path from the peripheral controller to the processor, wherein the processor is to receive second PM data from the peripheral controller via the second interconnect and in response to receipt of the second PM data, send the first PM data to the peripheral controller via the first interconnect, wherein the second PM data comprises a request to control a clock of the peripheral controller and the first PM data comprises a grant to notify the peripheral controller regarding grant of the request; and
a dynamic random access memory (DRAM) coupled to the processor.

10. The system of claim 9, wherein the processor is to be in one of a first activity state that has a first frequency of operation and a second activity state that has a second frequency of operation that is less than the first frequency of operation.

11. The system of claim 9, further comprising a socket including the processor, the first interconnect, the second interconnect, and the peripheral controller.

12. The system of claim 9, wherein the peripheral controller is to provide other PM data received from the processor to a chip set, the peripheral controller is to receive second data from the chip set in response to the first PM data, and the peripheral controller is to communicate the second data to the processor via the second interconnect.

13. The system of claim 9, wherein the processor is to send a request to turn off a shared power plane to the peripheral controller via the first interconnect.

14. The system of claim 13, wherein the peripheral controller is to send an acknowledgement of the request to the processor via the second interconnect.

15. A method comprising:
communicating first power management (PM) data from a first die of a processor socket to a second die of the processor socket, the second die comprising a peripheral controller and the first die comprising at least one core and a power controller, via a first uni-directional data path comprising a first interconnect; and
receiving second PM data at the first die from the second die via a second interconnect that is distinct from the first interconnect, wherein the first die is to receive the second PM data from the peripheral controller via the second interconnect and in response to receipt of the second PM data, send the first PM data to the peripheral controller via the first interconnect, wherein the second PM data comprises a request to control a clock of the peripheral controller and the first PM data comprises a grant to notify the peripheral controller regarding grant of the request;
wherein the first interconnect and the second interconnect are distinct from a primary interconnect to carry data other than the first PM data and the second PM data.

16. The method of claim 15, wherein the second interconnect comprises a second uni-directional data path from the second die to the first die.

17. The method of claim 15, further comprising communicating a notification to the peripheral controller that a reduction in power consumption can be executed by the peripheral controller.

18. The method of claim 15, wherein the at least one core is to be in one of a first activity state that has a first frequency of operation and a second activity state that has a second frequency of operation less than the first frequency of operation, and wherein the processor is in the second activity state while the first PM data is being communicated from the processor to the peripheral controller via the first interconnect.

19. The method of claim 15, further comprising transmitting the first PM data in packets of a fixed length, wherein transmission of each packet is preceded by a start bit and is followed by an end bit and wherein packet transmission starts with a least significant bit of the first PM data and ends with a most significant bit of the first PM data.

* * * * *